UNITED STATES PATENT OFFICE.

JOSEPH GLATZ, OF BROOKLYN, AND ORAZIO LUGO, OF NEW YORK, N. Y., ASSIGNORS TO THE INTERNATIONAL MAMBRINO CHEMICAL COMPANY, OF WASHINGTON, DISTRICT OF COLUMBIA.

PROCESS OF RENDERING FATS.

SPECIFICATION forming part of Letters Patent No. 585,643, dated June 29, 1897.

Application filed September 21, 1896. Serial No. 606,571. (No specimens.)

*To all whom it may concern:*

Be it known that we, JOSEPH GLATZ, of Brooklyn, and ORAZIO LUGO, of New York city, New York, have invented new and useful Improvements in Rendering Animal Fats, which improvements are fully set forth in the following specification.

Our invention relates to the art of rendering animal fats, such as tallow.

It is well known that fats of animal origin contain at times large amounts of nitrogenous substances, as cartilage, meat, albumen, &c., and during the process of rendering such fats the high heat required in the operation of rendering decomposes the nitrogenous matter, thereby imparting to the product or rendered fat a very disagreeable odor, which cannot be subsequently eliminated by any known mode of treatment.

It is the object of our invention to avoid the evil effects arising from the decomposition of the nitrogenous substances in animal fats during the process of rendering; and to this end our invention consists in preventing the decomposition of the nitrogenous substances by treating the fats with hydrated caustic lime while the same are being rendered.

In carrying out our invention we take a small quantity of an alkaline earth, preferably caustic lime, and add it to the fats being rendered before the heat in the rendering-tank has reached a degree sufficiently high to decompose the nitrogenous substances. When caustic lime is used, we take about one pound of the lime, previously made into a thin milk of lime, to every one hundred pounds of fat and let the same into the rendering-tank, care being taken to stir the mass so as to bring the lime into contact with all the nitrogenous matter.

If desired, more than the one per cent. of lime mentioned above may be employed; but we have found that even this small amount is usually sufficient to effect the desired defecation and leave the product free from animal taint. Tallow produced by this process is not only whiter, but much harder, because of its complete defecation.

Having thus described our invention, what we claim as new, and desire to secure by Letters Patent, is—

1. The process of rendering animal fats which consists in treating the same with an oxid of an alkaline earth during the continued application of heat, substantially as described.

2. The process of rendering animal fats having nitrogenous matters mixed therewith, which consists in treating the same with an oxid of an alkaline earth in the presence of heat but before the heat reaches a degree high enough to decompose the nitrogenous matters, whereby the decomposition of said nitrogenous matters is avoided, substantially as described.

3. The process of rendering animal fats which consists in treating the same with lime during the continued application of heat, substantially as described.

4. The process of rendering animal fats which consists in treating the same with hydrated lime during the continued application of heat, substantially as described.

5. The process of treating fats which consists in adding thereto a small percentage of hydrated lime while said fats are being rendered, substantially as described.

6. The process of treating animal fats which consists in adding thereto, during the process of rendering, a small per cent. of lime made into a milk of lime, said addition being made before the mass reaches a degree of heat sufficient to decompose the nitrogenous matters contained in the fats, substantially as described.

In testimony whereof we have signed this specification in the presence of two subscribing witnesses.

JOSEPH GLATZ.
ORAZIO LUGO.

Witnesses:
J. M. ALLEN,
M. H. BICKLEY.